(12) United States Patent
Hasegawa et al.

(10) Patent No.: US 9,869,410 B2
(45) Date of Patent: Jan. 16, 2018

(54) BUCKLING PATTERN STEEL PIPE

(71) Applicant: JFE Engineering Corporation, Tokyo (JP)

(72) Inventors: Nobuhiro Hasegawa, Tokyo (JP); Toshio Imai, Tokyo (JP); Hiroshi Nagamine, Tokyo (JP); Hayato Nakazono, Tokyo (JP)

(73) Assignee: JFE ENGINEERING CORPORATION, Tokyo (JP)

( * ) Notice: Subject to any disclaimer, the term of this patent is extended or adjusted under 35 U.S.C. 154(b) by 0 days.

(21) Appl. No.: 15/031,578

(22) PCT Filed: May 15, 2015

(86) PCT No.: PCT/JP2015/064070
§ 371 (c)(1),
(2) Date: Apr. 22, 2016

(87) PCT Pub. No.: WO2016/185523
PCT Pub. Date: Nov. 24, 2016

(65) Prior Publication Data
US 2017/0102100 A1 Apr. 13, 2017

(51) Int. Cl.
*F16L 9/02* (2006.01)
*F16L 57/02* (2006.01)
(52) U.S. Cl.
CPC .......... *F16L 9/02* (2013.01); *F16L 57/02* (2013.01)
(58) Field of Classification Search
CPC ........................................................ F16L 9/02
(Continued)

(56) References Cited

U.S. PATENT DOCUMENTS 2,728,356 A * 12/1955 Brinsmade ............ F16L 11/111
  138/121
6,371,859 B1 * 4/2002 Gibson ..................... F16C 3/02
  138/DIG. 11
(Continued)

FOREIGN PATENT DOCUMENTS

JP 2010-230106 A 10/2010
JP 5035287 B2 9/2012
(Continued)

OTHER PUBLICATIONS

Decision of Patent Grant of JP 2015-539895, which corresponds to PCT/JP2015/064070, dated Dec. 22, 2015.
(Continued)

*Primary Examiner* — Craig Schneider
*Assistant Examiner* — David Deal
(74) *Attorney, Agent, or Firm* — McDermott Will & Emery LLP

(57) ABSTRACT

A buckling pattern steel pipe for being buried in ground in which flexure occurs includes: a steel pipe straight portion; and a buckling pattern portion. The buckling pattern portion is in a shape expressed by a sine wave determined based on: a buckling wavelength which is 2.05 to 4.32 times a compression local buckling half wavelength expressed by $1.72\sqrt{(r \cdot T)}$; and a crest height expressed by a value 8.00 to 16.25 times a pipe thickness of the steel pipe straight pipe portion, and the buckling pattern portion absorbs bending compression deformation caused by faulting of the ground and axial compression deformation caused by the flexure so as to avoid deformation of the steel pipe straight pipe portion, where r is a pipe thickness center radius of the steel pipe straight pipe portion and T is the pipe thickness of the steel pipe straight pipe portion.

4 Claims, 4 Drawing Sheets

(58) Field of Classification Search
USPC .................................................. 138/100, 119
See application file for complete search history.

(56) References Cited

U.S. PATENT DOCUMENTS 8,215,084 B2 *  7/2012  Bowman ................... E04C 3/32
                                                   52/40
2014/0202576 A1    7/2014  Shitamoto

FOREIGN PATENT DOCUMENTS

| JP | 2013-049061 A | 3/2013 |
| JP | 2015-013314 A | 1/2015 |
| WO | 2011/055636 A1 | 5/2011 |
| WO | 2013/002094 | 1/2013 |

OTHER PUBLICATIONS

International Search Report issued in corresponding Application No. PCT/JP2015/064070, dated Jul. 7, 2015.

* cited by examiner

VERTICAL

HORIZONTAL

FAULT DISPLACEMENT

DISTANCE BETWEEN PLASTIC HINGES

BENDING ANGLE : 1.2°
AXIAL COMPRESSION : 1.5m 198.5m(AFTER EARTHQUAKE)

VERTICAL

3m

HORIZONTAL 1.5m

FAULT DISPLACEMENT

200m(AFFECTED AREA)

BUCKLING PATTERN STEEL PIPE

CROSS REFERENCE

This application is the U.S. National Phase under 35 US.C. §371 of International Application No. PCT/JP2015/064070, filed on May 15, 2015, the entire content of which is hereby incorporated by reference.

FIELD

The present invention relates to a buckling pattern steel pipe.

BACKGROUND

Conventionally, steel pipes for carrying oil, gas, electricity, water, and the like are buried in ground. However, a large number of faults are distributed in the ground and the lengths of the faults are long. Therefore it is difficult to bury the steel pipes while skirting the faults. As illustrated in FIG. 1, a fault is a phenomenon which occurs in hard ground and in which a fracture (fault plane) occurs in strata and rocks, and opposite sides are displaced from each other along the fault plane. The displacement in the fault plane reaches several meters on average. Therefore, if a steel pipe is buried in hard ground while crossing a fault plane and faulting occurs, local bending compression deformation of the steel pipe occurs. In order to avoid occurrence of a rupture or a crack due to displacement caused by the faulting, the steel pipe buried in the ground has a displacement absorbing structure for absorbing the displacement.

CITATION LIST

Patent Literature

Patent Literature 1: Japanese Patent No. 5035287

SUMMARY

Technical Problem

In soft ground, on the other hand, a phenomenon called "fold" occurs. The fold is the phenomenon in which strata which were horizontal when they were laid down are bent into wavy shapes due to crustal movement. The fold gently causes deflection in a wide area. Therefore, if a steel pipe is buried in the soft ground and the crustal movement occurs, axial compression deformation occurs in a wide area of the steel pipe.

As illustrated in FIGS. 2 and 3, in ground in which soft ground is laid on hard ground, a phenomenon called "flexure" occurs. The flexure is the phenomenon in which a fault occurs in the lower hard ground and deflection occurs in the upper soft ground. However, the fault plane may stay within the hard ground or reach the soft ground, which is highly unpredictable. Therefore, in order to bury a steel pipe in the ground in which the flexure occurs, it is necessary to take measures to avoid occurrence of a rupture and a crack due to both local bending compression deformation caused by faulting and axial compression deformation in a wide area caused by the flexure.

The present invention has been made with the above circumstances in view, and its object is to propose a buckling pattern steel pipe in which it is possible to avoid occurrence of a rupture and a crack due to both local bending compression deformation caused by faulting and axial compression deformation in a wide area caused by a flexure.

Solution to Problem

To solve the above-described problem and achieve the object, a buckling pattern steel pipe according to the present invention is (a) a buckling pattern steel pipe including a buckling pattern portion, and the buckling pattern portion is in a shape expressed by a sine wave determined based on: a buckling wavelength which is 2.05 to 4.32 times a compression local buckling half wavelength expressed by $1.72\sqrt{(r \cdot T)}$; and a crest height expressed by a value 8.00 to 16.25 times a pipe thickness of a steel pipe straight pipe portion, where r is a pipe thickness center radius of the steel pipe straight pipe portion and T is the pipe thickness of the steel pipe straight pipe portion.

(2) Moreover, in the above-described buckling pattern steel pipe (1), it is preferable that the buckling pattern portions are disposed at an interval in an axial direction of the buckling pattern steel pipe.

(3) Moreover, in the above-described buckling pattern steel pipe (1) or (2), it is preferable that buckling the buckling pattern portion deforms due to axial compression deformation or bending compression deformation.

(4) Moreover, in the above-described buckling pattern steel pipe (2) or (3), it is preferable that the buckling pattern portions are disposed on opposite sides of a fault plane at a predetermined interval.

Advantageous Effects of Invention

With the buckling pattern steel pipe according to the present invention, it is possible to avoid occurrence of a rupture and a crack due to both local bending compression deformation caused by faulting and axial compression deformation in a wide area caused by a flexure.

DESCRIPTION OF EMBODIMENT

An embodiment of a buckling pattern steel pipe 1 according to the present invention will be described below with reference to the drawings. The invention is not limited to the embodiment.

Figure 4:
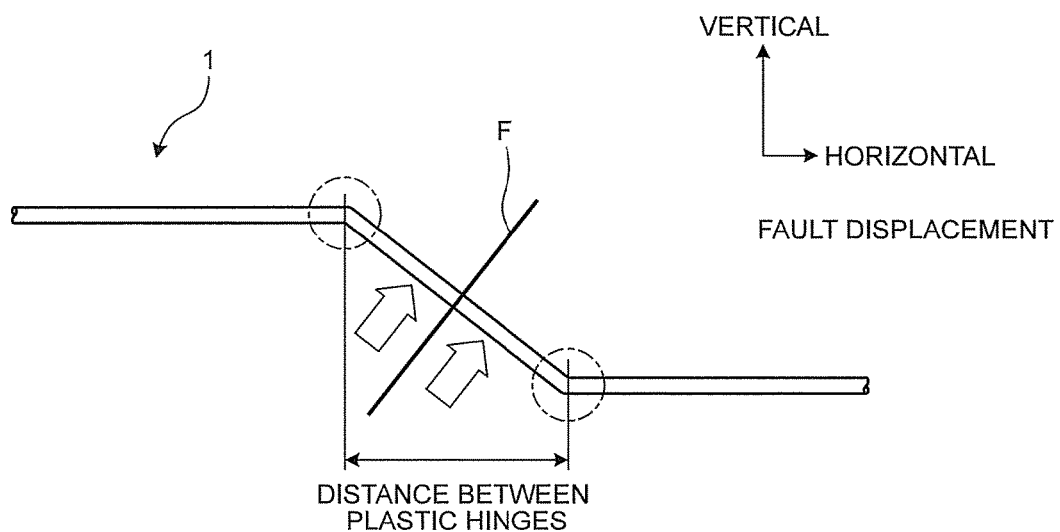
FIG. 4 is a schematic diagram for explaining deformation of the buckling pattern steel pipe according to the embodiment when a fault occurs in the ground in which the pipe is buried.
Figure 5:
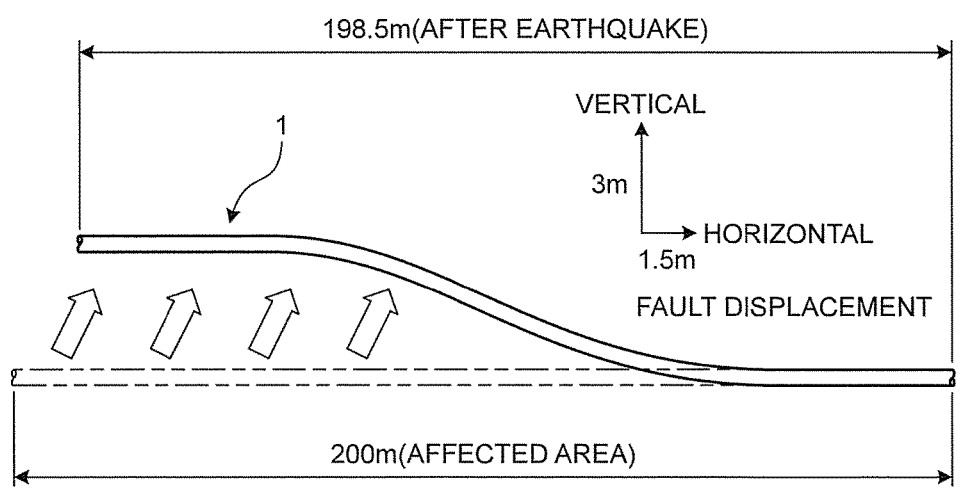
FIG. 5 is a schematic diagram for explaining deformation of the buckling pattern steel pipe according to the embodiment when the flexure occurs in the ground in which the pipe is buried.

The buckling pattern steel pipe 1 according to the embodiment of the invention is for avoiding occurrence of a rupture and a crack due to both local bending compression deformation caused by faulting illustrated in FIG. 4 and axial compression deformation in a wide area caused by a flexure illustrated in FIG. 5. The local bending compression deformation caused by the faulting occurs at portions on opposite sides of a fault plane F at a predetermined distance (hereafter referred to as "distance between plastic hinges") from each other. A portion where the bending compression deformation occurs is called "plastic hinge". This bending compression deformation occurs locally and reaches several meters on average. The axial compression deformation in the wide area caused by the flexure causes gentle deflection throughout 200 m in an axial direction when fault displacement is 3 m in a vertical direction and 1.5 m in a horizontal direction, for example.

Figure 6:
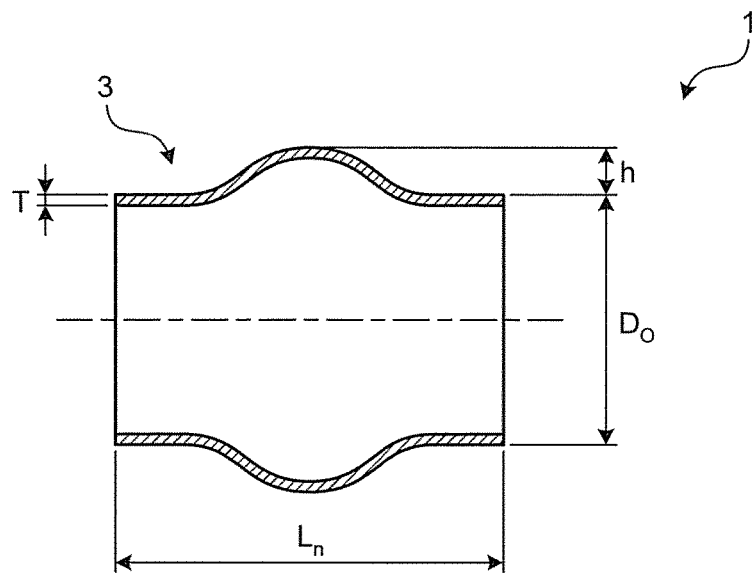
FIG. 6 is a partial sectional view of the buckling pattern steel pipe according to the embodiment.
Figure 7:
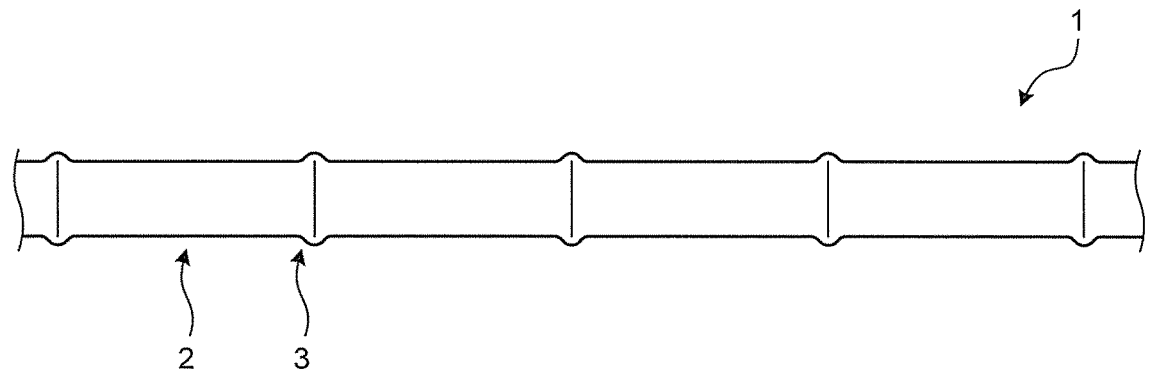
FIG. 7 is a front view of the buckling pattern steel pipe according to the embodiment.

The buckling pattern steel pipe 1 is made of mild steel (carbon steel with a carbon content of 0.13 to 0.20%) including SS400, for example. As illustrated in FIGS. 6 and 7, the buckling pattern steel pipe 1 is formed by repeatedly forming a steel pipe straight pipe portion 2 and a buckling pattern portion 3 in the axial direction.

Each of the buckling pattern portions 3 is a portion for absorbing the local bending compression deformation caused by the faulting and the axial compression deformation in the wide area caused by the flexure. The buckling pattern portion 3 is formed in a shape similar to compression local buckling which occurs in a steel pipe. At the time of crustal movement, the buckling pattern steel pipe 1 absorbs the displacement by deformation of the buckling pattern portions 3. A reaction force in an axial compression direction of the buckling pattern portions 3 is reduced as compared with that at the steel pipe straight pipe portions 2. In other words, the buckling pattern portion 3 is deformed prior to deformation of the steel pipe straight pipe portion 2 to thereby avoid the deformation of the steel pipe straight pipe portion 2.

Each of the buckling pattern portions 3 is formed by bulging outward in a radial direction of the steel pipe straight pipe portions 2. The buckling pattern portion 3 is in a shape expressed by a sine wave determined based on buckling wavelength $L_n$ which is 2.05 to 4.32 times compression local buckling half wavelength L expressed by $1.72\sqrt{(r \cdot T)}$ and crest height h expressed by a value 8.00 to 16.25 times pipe thickness T of the steel pipe straight pipe portion 2. Here, $r=(D_o-T)/2$. r is a pipe thickness center radius (distance from a center of the steel pipe to a center of the pipe thickness) of the steel pipe straight pipe portion, $D_o$ is an outer diameter of the steel pipe straight pipe portion, and T is the pipe thickness of the steel pipe straight pipe portion.

An optimum shape of each of the buckling pattern portions 3 is determined by carrying out FEM (Finite Element Method) analyses in consideration of outer diameter $D_o$, pipe thickness T, crest height h, buckling wavelength $L_n$, material (an elastic modulus), the fault displacement, ground conditions, and the like. Here, an example of a method of studying the optimum shape by using the FEM analysis will be described. Outer diameter $D_o$ and pipe thickness T are a diameter (800 A to 3000 A, for example) and a thickness which are employed for the buckling pattern steel pipe 1. Optimum buckling wavelength $L_n$ is selected so that a relationship between the reaction force in the axial compression direction and an axis displacement obtained by the FEM analyses using buckling wavelength $L_n$ as a variable and without changing crest height h and pipe thickness T takes a curve which transits with a gentle slope after reaching a largest value of the reaction force in the axial compression direction when a vertical axis represents the reaction force in the axial compression direction and a horizontal axis represents the axis displacement. Optimum crest height h is selected so that a relationship between the reaction force in the axial compression direction and the axis displacement obtained by the FEM analyses using crest height h as a variable and without changing buckling wavelength $L_n$ and pipe thickness T takes a curve which transits with a gentle slope after reaching a largest value of the reaction force in the axial compression direction when a vertical axis represents the reaction force in the axial compression direction and a horizontal axis represents the axis displacement. Optimum pipe thickness T is selected so that a relationship between the reaction force in the axial compression direction and the axis displacement obtained by the FEM analyses using pipe thickness T as a variable and without changing buckling wavelength $L_n$ and crest height h takes a curve which transits with a gentle slope after reaching a largest value of the reaction force in the axial compression direction when a vertical axis represents the reaction force in the axial compression direction and a horizontal axis represents the axis displacement. Optimum material is selected so that a relationship between the reaction force in the axial compression direction and the axis displacement obtained by the FEM analyses using a plurality of elastic moduli takes a curve which transits with a gentle slope after reaching a largest value of the reaction force in the axial compression direction when a vertical axis represents the reaction force in the axial compression direction and a horizontal axis represents the axis displacement. A plurality of cases are formed by combining buckling wavelength $L_n$, crest height h, pipe thickness T, and the material selected as described above, the FEM analyses are carried out for the respective cases, and results of largest values of the reaction force in the axial compression direction and permissible displacements are calculated. Among the obtained results, an ideal case is a case with a smaller largest value of the reaction force in the axial compression direction and a larger permissible displacement.

Table 1 shows examples in which optimum shapes of the buckling pattern portion 3 with reduced reaction forces in the axial compression direction and largest permissible bending angles were obtained by carrying out the FEM analyses using outer diameter $D_o$, pipe thickness T, crest height h, buckling wavelength $L_n$, material (the elastic modulus) as the variables as described above.

TABLE 1

Unit: mm

| Example No. | Outer diameter $D_o$ | Pipe thickness T | Crest height h | Buckling wavelength $L_n$ |
| --- | --- | --- | --- | --- |
| Example 1 | 812.8 | 8.0 | 64 | 200 |
| Example 2 | 914.4 | 8.0 | 130 | 260 |
| Example 3 | 1016.0 | 16.0 | 155 | 600 |
| Example 4 | 1117.6 | 10.0 | 160 | 320 |
| Example 5 | 1219.2 | 11.0 | 175 | 350 |
| Example 6 | 1371.6 | 12.0 | 195 | 390 |
| Example 7 | 1524.0 | 14.0 | 215 | 430 |
| Example 8 | 1625.6 | 15.0 | 230 | 460 |
| Example 9 | 1676.4 | 15.0 | 235 | 470 |
| Example 10 | 1828.8 | 16.0 | 260 | 520 |
| Example 11 | 1930.4 | 17.0 | 270 | 540 |
| Example 12 | 2032.0 | 18.0 | 285 | 570 |
| Example 13 | 2032.0 | 18.0 | 240 | 1000 |
| Example 14 | 2133.6 | 19.0 | 300 | 600 |
| Example 15 | 2235.2 | 20.0 | 315 | 630 |

TABLE 1-continued

| Example No. | Outer diameter $D_o$ | Pipe thickness T | Crest height h | Unit: mm Buckling wavelength $L_n$ |
|---|---|---|---|---|
| Example 16 | 2336.8 | 21.0 | 330 | 660 |
| Example 17 | 2438.4 | 22.0 | 345 | 690 |
| Example 18 | 2540.0 | 23.0 | 360 | 720 |
| Example 19 | 2641.6 | 24.0 | 375 | 750 |
| Example 20 | 2743.2 | 25.0 | 390 | 780 |
| Example 21 | 2844.8 | 26.0 | 400 | 800 |
| Example 22 | 2946.4 | 27.0 | 415 | 830 |
| Example 23 | 3048.0 | 29.0 | 430 | 860 |

The buckling pattern steel pipes 1 having the buckling pattern portions 3 of outer diameter $D_o$, pipe thickness T, crest height h, and buckling wavelength $L_n$ shown in Table 1 are buried in the ground while disposed at a midpoint of a pipeline. These buckling pattern steel pipes 1 deform at the buckling pattern portions 3 to thereby avoid occurrence of ruptures and cracks when fault displacement is caused by crustal movement. Deformation confirmatory experiments and the FEM analyses using actual pipes verified that these buckling pattern steel pipes 1 had absorbed both of local bending compression deformation due to faulting and axial compression deformation in wide areas caused by flexure by deforming at the buckling pattern portions 3 and suppressed distortion of the steel pipe straight pipe portions 2.

In the deformation confirmatory experiment using the actual pipe, a load in the axial compression direction is applied to the buckling pattern steel pipe 1 and the reaction force in the axial compression direction and the axis displacement are measured. In the deformation confirmatory experiment using the actual pipe, whether a curve with a vertical axis representing the reaction force in the axial compression direction and a horizontal axis representing the axis displacement reproduces the above described curve obtained by the FEM analyses and with the vertical axis representing the reaction force in the axial compression direction and the horizontal axis representing the axis displacement is determined. Moreover, in the deformation confirmatory experiment using the actual pipe, the buckling pattern steel pipe 1 after the deformation is checked by a visual inspection or a pinhole inspection for presence or absence of the rupture or the crack.

In the verification by the FEM analysis, the ground in which the buckling pattern steel pipe 1 is buried is set to be a continuous body (solid element) of earth material and a non-linear FEM analysis is carried out for an elastic-plastic model in consideration of contact with the pipeline including the buckling pattern steel pipe 1. In the verification by the FEM analysis, the bending angle of the buckling pattern steel pipe 1 is calculated and the buckling pattern steel pipe 1 with the bending angle not larger than a permissible angle is determined to be effective.

From Table 1, buckling wavelength $L_n$ of the buckling pattern portion 3 is 2.05 to 4.32 times compression local buckling half wavelength L and crest height h is 8.00 to 16.25 times pipe thickness T of the steel pipe straight pipe portion 2 as described above.

Concretely, Example 1 has outer diameter $D_o$ of 812.8 mm and pipe thickness T of 8.0 mm and therefore compression local buckling half wavelength L obtained by calculation is 97.6 mm. As a result, buckling wavelength $L_n$ (=200 mm) is 2.05 times compression local buckling half wavelength L by calculation. By similar calculation in the other examples, buckling wavelength $L_n$ is 2.05 to 4.32 times compression local buckling half wavelength L.

Concretely, Example 1 has pipe thickness T of 8.0 mm and crest height h of 64 mm and therefore a height ratio (h/T) is 8.00 times by calculation. By similar calculation in the other examples, a height ratio (h/T) is 8.00 to 16.25 times.

Buckling pattern portions 3 are disposed on opposite sides of a fault plane F at an interval of a distance between plastic hinges. Here, as the distance between the plastic hinges, an optimum value is calculated by carrying out the FEM analysis in consideration of fault displacement and ground conditions at the time of design in burial of the buckling pattern steel pipe 1. More specifically, the distance between the plastic hinges is several times outer diameter $D_o$ of the buckling pattern steel pipe 1.

Next, workings of the buckling pattern steel pipe 1 having the above-described structure will be described.

Figure 1:
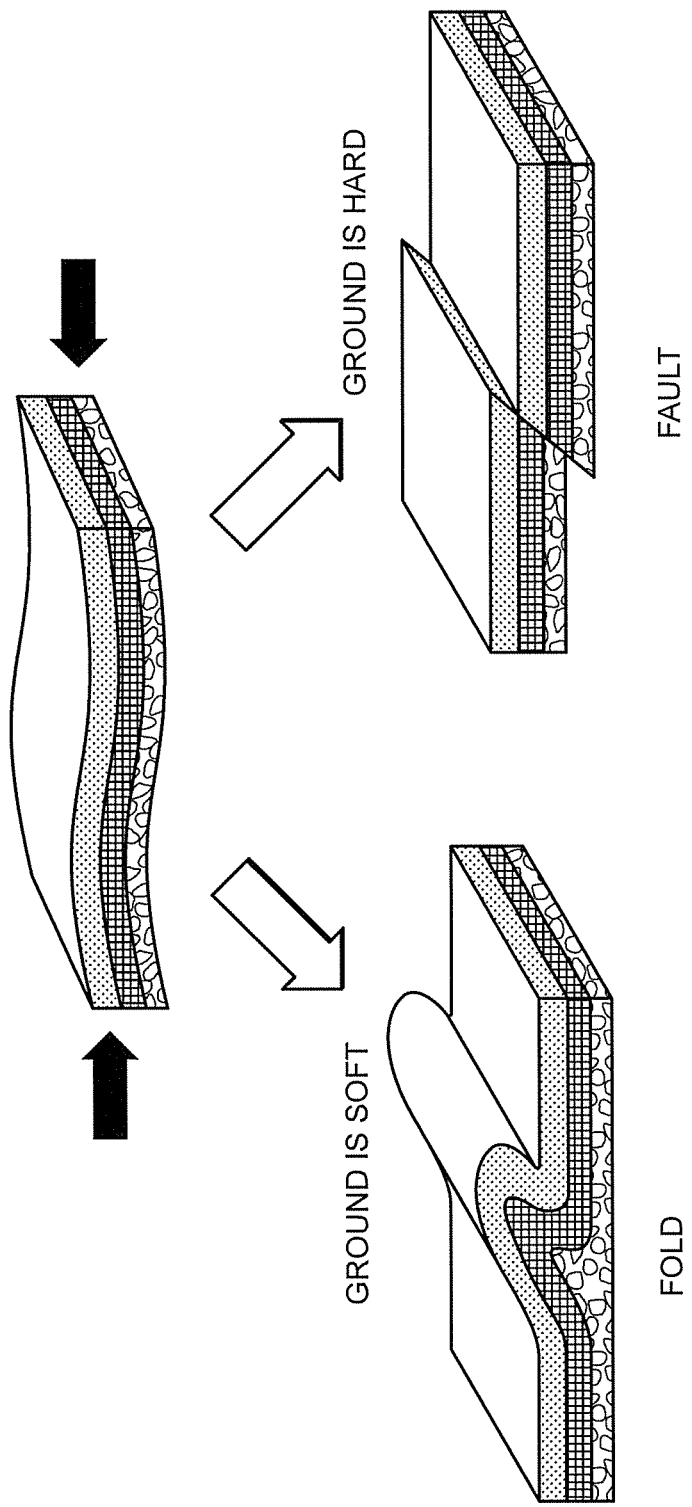
FIG. 1 is a schematic diagram for explaining phenomena which occur in ground.
Figure 2:
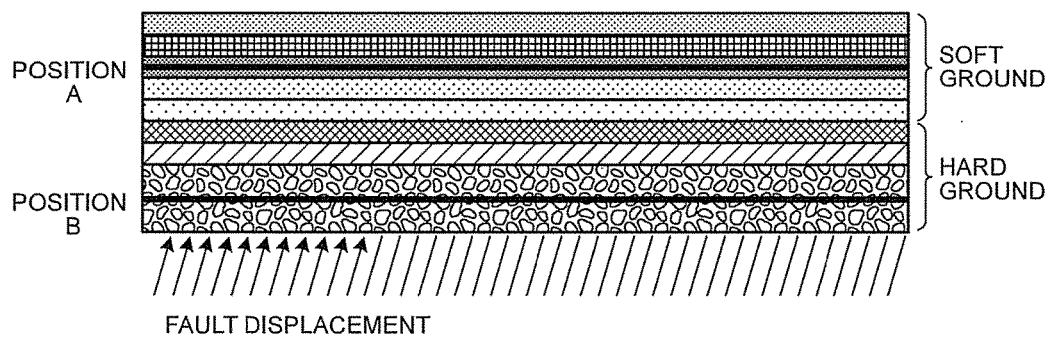
FIG. 2 is a schematic diagram for explaining ground in which a buckling pattern steel pipe according to an embodiment is buried and a flexure occurs.
Figure 3:
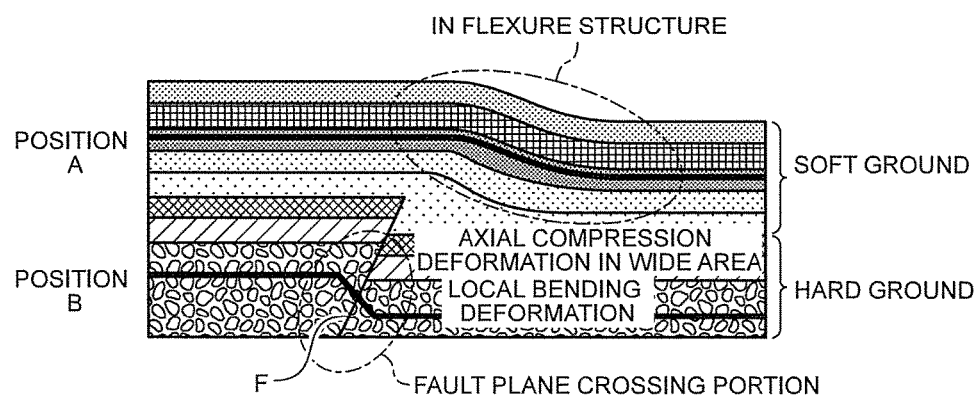
FIG. 3 is a schematic diagram for explaining deformation of the buckling pattern steel pipe according to the embodiment when the flexure occurs in the ground in which the pipe is buried.

If the buckling pattern steel pipe 1 is buried in the ground in which the flexure occurs and if fault displacement is caused by the crustal movement and a fault reaches a depth of the burial of the buckling pattern steel pipe 1, i.e., if the buckling pattern steel pipe 1 is crossing the fault plane F, the bending compression deformation of the buckling pattern steel pipe 1 occurs as illustrated in FIG. 4. On the other hand, if the buckling pattern steel pipe 1 is buried in the hard ground (at position B in FIGS. 2 and 3) below the ground in which the flexure occurs and when if fault displacement is caused by crustal movement, the buckling pattern steel pipe 1 crosses the fault plane F and the bending compression deformation of the buckling pattern steel pipe 1 occurs as illustrated in FIG. 4.

If the buckling pattern steel pipe 1 is buried in the ground in which the flexure occurs (at position A in FIGS. 2 and 3) and if fault displacement is caused by crustal movement and a fault does not reach a depth of the burial of the buckling pattern steel pipe 1, i.e., if the flexure occurs in the ground around the buckling pattern steel pipe 1, the axial compression deformation of the buckling pattern steel pipe 1 occurs as illustrated in FIG. 5.

In the above-described buckling pattern steel pipe 1, because reaction forces of the buckling pattern portions 3 are smaller than those of the steel pipe straight pipe portions 2, the buckling pattern portions 3 deforms prior to the steel pipe straight pipe portions 2 when the crustal movement occurs in the ground in which the buckling pattern steel pipe 1 is buried and the local bending compression deformation due to the faulting or the axial compression deformation in the wide area due to the flexure occurs. In other words, the buckling pattern steel pipe 1 may absorb displacements of both of the local bending compression deformation caused by the faulting and the axial compression deformation in the wide area caused by the flexure at the buckling pattern portions 3.

The buckling pattern steel pipe 1 may absorb both of the local bending compression deformation caused by the faulting and the axial compression deformation in the wide area caused by the flexure at the buckling pattern portions 3. Therefore, the buckling pattern steel pipe 1 may be installed in both of the grounds where the fault and the flexure occur, respectively.

Because the buckling pattern portions 3 of the buckling pattern steel pipe 1 deforms prior to the steel pipe straight pipe portions 2, it is possible to suppress distortion of the steel pipe straight pipe portions 2. In this way, even if the buckling pattern portions 3 of the buckling pattern steel pipe 1 has deformed, it is possible to avoid major flattening of sections of the steel pipe straight pipe portions 2 and narrowing of sectional areas. Therefore, the buckling pattern steel pipe 1 may keep its function of carrying oil, gas, electricity, tap water, or the like.

The buckling pattern portions 3 of the buckling pattern steel pipe 1 are disposed at intervals in an axial direction of the buckling pattern steel pipe 1. Therefore, even if a position of the fault is unclear, the buckling pattern steel pipe 1 may absorb both of the local bending compression deformation caused by the faulting and the axial compression deformation in the wide area caused by the flexure when the crustal movement occurs in the ground in which the buckling pattern steel pipe 1 is buried.

The buckling pattern portions 3 may be disposed on opposite sides of the fault plane F at the interval of the optimum distance between the plastic hinges which is calculated by carrying out the FEM analyses in consideration of the fault displacement and the ground conditions. In this way, the buckling pattern steel pipe 1 may more reliably absorb the local bending compression deformation due to the faulting.

Therefore, with the buckling pattern steel pipe 1 according to the embodiment, it is possible to avoid occurrence of the rupture and the crack due to both of the local bending compression deformation caused by the faulting and the axial compression deformation in the wide area caused by the flexure.

The invention is not limited to the above-described embodiment and may be suitably changed or improved. Anything may be selected as the material, shapes, dimensions, the numbers, places of installation, and the like of the respective components in the above-described embodiment and they are not limited as long as the invention may be achieved.

If a buckling pattern steel pipe 1 is installed in a shield and crest heights h of the buckling pattern steel pipe 1 are limited by an inner wall face of the shield, one plastic hinge may be formed by a plurality of buckling pattern portions 3. In this case, the plurality of buckling pattern portions 3 are disposed at intervals of a distance which is a fraction of buckling wavelength $L_n$ (hereafter referred to as "distance between crests"). Here, an optimum distance between the crests is calculated by carrying out FEM analyses in consideration of fault displacement and ground conditions at the time of design in burial of the buckling pattern steel pipe 1. In this way, it is possible to avoid narrowing of a sectional area of the buckling pattern steel pipe 1 due to interference between deformations of the adjacent buckling pattern portions 3.

REFERENCE SIGNS LIST

1 buckling pattern steel pipe
2 steel pipe straight pipe portion
3 buckling pattern portion
$D_o$ outer diameter
r pipe thickness center radius of steel pipe straight pipe portion
T pipe thickness of steel pipe straight pipe portion
h crest height
L compression local buckling half wavelength
$L_n$ buckling wavelength

The invention claimed is:

1. A buckling pattern steel pipe for being buried in ground in which flexure occurs, comprising:
    a steel pipe straight portion; and
    a buckling pattern portion,
    wherein the buckling pattern portion is in a shape expressed by a partial sine wave determined based on: a buckling wavelength that is 2.05 to 4.32 times a compression local buckling half wavelength expressed by $1.72*\sqrt{r*T}$ and a crest height that is 8.00 to 16.25 times a pipe thickness of the steel pipe straight pipe portion, and
    the buckling pattern portion absorbs bending compression deformation caused by faulting of the ground and axial compression deformation caused by the flexure so as to avoid deformation of the steel pipe straight pipe portion,
    where r is a pipe thickness center radius of the steel pipe straight pipe portion and T is the pipe thickness of the steel pipe straight pipe portion.

2. The buckling pattern steel pipe according to claim 1, wherein the buckling pattern portions are disposed at an interval in an axial direction of the buckling pattern steel pipe.

3. The buckling pattern steel pipe according to claim 2, wherein the buckling pattern portions are disposed on opposite sides of a fault plane at a predetermined interval.

4. The buckling pattern steel pipe according to claim 1, wherein the partial sine wave is half wavelength of a sine wave.

* * * * *